United States Patent [19]

Ishida

[11] Patent Number: 5,619,906
[45] Date of Patent: Apr. 15, 1997

[54] CONTROL APPARATUS FOR AUTOMATIC COOKING APPARATUS

[75] Inventor: Takashi Ishida, Mie, Japan

[73] Assignee: Fuji Electric Co., Ltd., Kawasaki, Japan

[21] Appl. No.: 603,249

[22] Filed: Feb. 20, 1996

[30] Foreign Application Priority Data

Feb. 23, 1995 [JP] Japan .................................. 7-034958

[51] Int. Cl.⁶ .............................. A23L 1/00; A47J 27/62; H05B 1/02; G06F 17/100
[52] U.S. Cl. .............................. 99/344; 99/325; 99/334; 99/386; 99/443 C; 364/400; 364/577
[58] Field of Search .................... 99/325–334, 342–344, 99/352–355, 386, 443 R, 443 C, 467, 468, 477–479; 364/400, 405, 577, 479.1; 219/492, 506, 710, 388

[56] References Cited

U.S. PATENT DOCUMENTS

| | | | |
|---|---|---|---|
| 4,309,584 | 1/1982 | Terakami | 99/342 X |
| 4,484,065 | 11/1984 | Ueda | 219/492 |
| 4,780,588 | 10/1988 | Edamura | 99/325 X |
| 4,816,635 | 3/1989 | Edamura | 219/506 X |
| 4,913,038 | 4/1990 | Burkett et al. | 99/331 |
| 4,919,950 | 4/1990 | Mak | 99/443 R |
| 4,968,515 | 11/1990 | Burkett et al. | 99/327 |
| 5,044,262 | 9/1991 | Burkett et al. | 99/332 X |
| 5,096,116 | 3/1992 | Akamatu et al. | 99/331 X |
| 5,172,328 | 12/1992 | Cahlander et al. | 364/400 X |
| 5,398,597 | 3/1995 | Jons et al. | 99/344 X |

*Primary Examiner*—Timothy F. Simone
*Attorney, Agent, or Firm*—Kanesaka & Takeuchi

[57] ABSTRACT

An automatic cooking apparatus with a control apparatus prepares various food items by combining plural kinds of food stuffs. The apparatus is formed of a plurality of delivery devices, each storing one kind of food stuff and delivering the same; a transport device situated under the delivery means for transporting a food item during preparation to the delivery device; an input device for inputting data including a menu, combination ratios of the food stuffs for various food items and number of food item to be prepared; and sensors situated in the respective delivery devices and electrically connected to the input device. Each sensor detects deficiency of the food stuff stored in each delivery device. A control device is connected to the delivery devices, the transport device and the input device. When one food item can not be prepared by deficiency of the food stuff, the control device checks if a food item which can be prepared without the deficiency food stuff has been ordered. If it is ordered, such food item is prepared.

6 Claims, 6 Drawing Sheets

|  | ITEM A | ITEM B | ITEM C |
|---|---|---|---|
| STUFF 1 | 0.5 | 0.4 | 0.4 |
| STUFF 2 | 0.2 | 0.0 | 0.2 |
| STUFF 3 | 0.2 | 0.3 | 0.2 |
| STUFF 4 | 0.1 | 0.3 | 0.2 |

SCREEN IMAGE 1

FIG.3B

```
PREPARATION MENU
1. ITEM A 10 PIECES
2. ITEM B 25 PIECES
3. ITEM C 20 PIECES
4.   :
 :   :
```

SCREEN IMAGE 2

FIG.3C

```
STUFF 2
DEFICIENT
ITEM B UNDER PREPARATION
ITEM A REMAINING 5 PIECES
```

SCREEN IMAGE 3

FIG.3D

CONTROL APPARATUS FOR AUTOMATIC COOKING APPARATUS

BACKGROUND OF THE INVENTION AND RELATED ART STATEMENT

The present invention relates to a control apparatus for an automatic cooking apparatus which prepares various food items by combining plural kinds of food stuffs.

A general automatic cooking apparatus according to the prior art stops or continues cooking when certain kinds of food stuffs do not remain in the apparatus any more.

Even if the apparatus runs out of some food stuffs, there may be certain food items which can be prepared from the remaining food stuffs. Therefore, if some food stuffs still remain in the cooking apparatus, it is wasteful to stop cooking. On the other hand, if this kind of situation is avoided, it requires labor to frequently check the residual amounts of the food stuffs and to supply the consumed food stuffs.

In view of the foregoing, it is an object of the invention to provide a control apparatus that controls an automatic cooking apparatus for preventing the time-consuming maintenance and for improving the net operating efficiency of the cooking apparatus.

SUMMARY OF THE INVENTION

According to the present invention, there is provided a control apparatus for an automatic cooking apparatus that prepares various food items by combining, based on input data, plural kinds of food stuffs. The automatic cooking apparatus with the control apparatus comprises: a plurality of delivery means for storing and delivering food stuffs; transport means for transporting food items during preparation to next delivery means; input means for inputting data including combination ratios of the food stuffs and number of food items to be prepared for all of the food items in a menu; storage means for storing the input data; transmitting means for transmitting the input data to the delivery means; and control means for controlling the delivery means, the transport means, the input means, the storage means and the transmitting means. The apparatus further includes sensors installed on the respective delivery means for detecting the deficiency of the food stuffs stored in the respective delivery means; and alarm means for alarming the deficiency of food stuffs.

The sensor for detecting the deficiency of a food stuff sends a deficiency signal to the control means. When the control means receives the deficiency signal of a food stuff, the control means judges whether any food item that can be prepared from the remaining food stuffs is ordered or not. If the control means finds that a food item that can be prepared from the remaining food stuffs has been ordered, the control means controls the delivery means to continue preparing the food item. If the control means finds that any food item that can be prepared from the remaining food stuffs has not been ordered, the control means controls the alarm means to alarm the deficiency of the food stuffs.

Each sensor preferably comprises a light emitter and a light detector facing with each other across the delivery means. The light emitter preferably comprises a light emitting diode. The light detector preferably comprises a phototransistor or a photodiode.

FIG. 4 is a diagram relating to the constituent elements in one aspect of the invention.

The net operating efficiency of the automatic cooking apparatus of the invention is not lowered by preparing an ordered food item that can be prepared from the remaining food stuffs where the residual amounts in the cooking apparatus are still enough.

BRIEF DESCRIPTION OF THE DRAWINGS

FIG. 3(B) is a screen image displaying the combination ratios of the food stuffs for respective food items;

FIG. 3(C) is a screen image displaying the preparation order and number of the food items to be prepared;

FIG. 3(D) is a screen image displaying the food item for which preparation is interrupted;

DETAILED DESCRIPTION OF PREFERRED EMBODIMENTS

Figure 1:
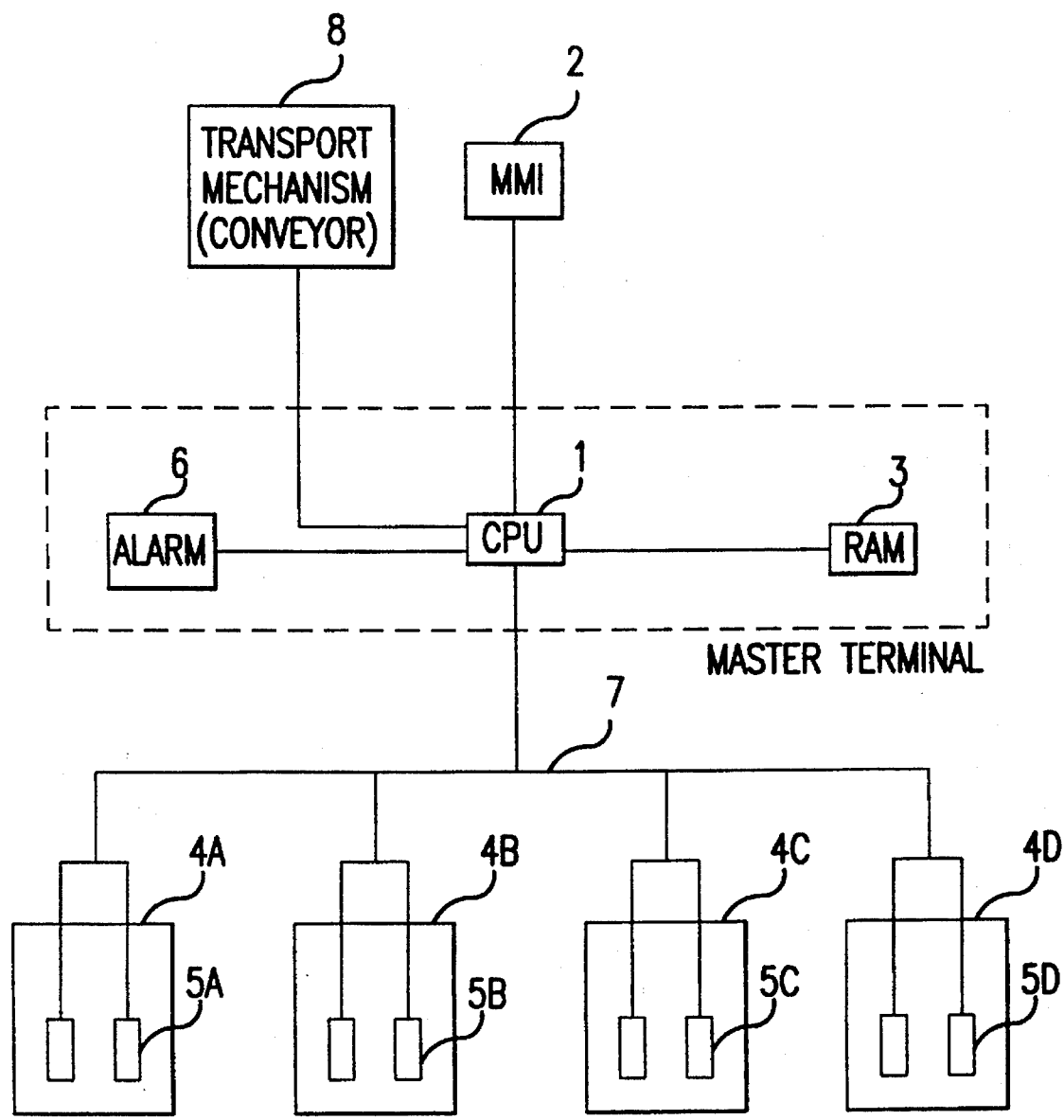
FIG. 1 is a block diagram showing an embodiment of a cooking apparatus with a control apparatus according to the present invention.

FIG. 1 is a block diagram showing an embodiment of a cooking apparatus with a control apparatus according to the present invention.

In FIG. 1, a master terminal comprises a CPU 1 that executes various operations and controls the entire system. A man-machine interface (hereinafter referred to as "MMI") 2 includes a keyboard for data input, a display for data display and etc. Data, such as a menu, combinations of food stuffs for respective food items, combination ratios thereof and etc. is inputted from the MMI 2. The data inputted from the MMI 2 is stored in a RAM 3. Slaves 4A through 4D include delivery mechanisms which store and deliver the food stuffs, controllers which control the respective delivery mechanisms and etc. Sensors 5A through 5D are disposed for detecting the states of the slaves whether the residual amounts of the food stuffs stored in the cooking apparatus, i.e. delivery mechanisms, are not enough (hereinafter referred to as "deficiency state"). An alarm 6 alarms, on a display, through a speaker or a buzzer or combination thereof, the deficiency state of a food stuff. The CPU 1 and the slaves 4A through 4D are connected by communication lines 7. A transport mechanism 8, such as a conveyor, transports a food item or food items during preparation.

For example, in case of cooking tacos, the slave 4A may be a tortilla delivery mechanism that has shelves, on which tortillas used as shells for the tacos are piled up and stored. In a delivery process, the tortilla is absorbed by a sucking disc, so that the tortilla is taken out one by one. The slave 4B may be a ground meat or beef delivery mechanism that has a hopper in which ground meat or beef is stored. The delivery of the ground beef is operated by a piston pump that pushes out a predetermined amount of ground beef through a cylinder installed on the bottom of the hopper. The slave 4C may be a sour cream delivery mechanism that stores yogurt-like sour cream in a flexible tube, from which the sour cream is squeezed out by a roller driven by a motor. And, the slave 4D may be a lettuce delivery mechanism that stores the shredded lettuce, which are sent outside, e.g. by a screw mechanism driven by a motor, in the delivery operation. Sliced cheese and tomatoes may be stored and delivered by similar delivery mechanisms.

Figure 5A:
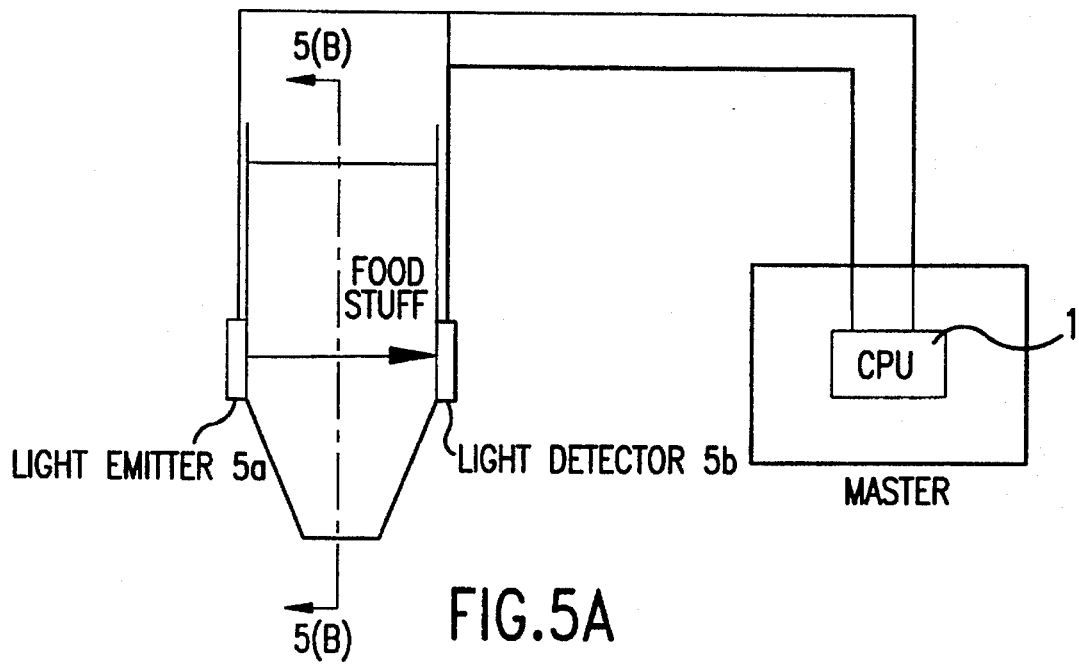
FIG. 5(A) is a schematic view for explaining the installation of a deficiency sensor on a food stuff delivery mechanism.
Figure 5B:
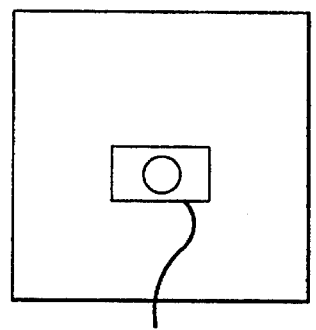
FIG. 5(B) is a sectional view taken along line 5(B)—5(B) in FIG. 5(A)
Figure 6:
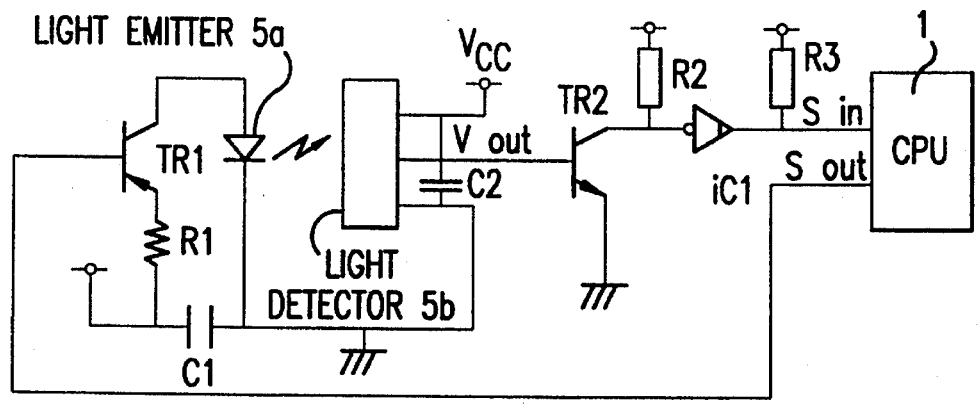
FIG. 6 is a circuit diagram of the deficiency sensor.

FIG. 5 is a schematic view for explaining the installation of a sensor 5 for detecting the deficiency of food stuffs stored in a food stuff delivery mechanism. Hereinafter, the sensor will be sometimes referred to as a "deficiency sensor". And, FIG. 6 is a circuit diagram of the deficiency sensor. Referring now to FIGS. 5 and 6, the deficiency sensor 5 comprises a light emitter 5a and a light detector 5b facing one another across the delivery mechanism 4. The deficiency sensor is installed on each delivery mechanism 4 at a level higher than the bottom of the delivery mechanism for a predetermined distance. The light emitter 5a comprises a light emitting diode (LED) D1 and a transistor TR1 for driving the LED D1. The base of the transistor TR1 is connected to the CUP 1. The light detector 5b comprises a phototransistor or a photodiode, to which a bias voltage VCC for setting light detection threshold is connected. Hereinafter, explanation will be made by way of a phototransistor. The signal VOUT fed from the phototransistor is connected to the base of a transistor TR2. The collector of the transistor TR2 is connected to an inverting amplifier iC1. And, the output of the inverting amplifier iC1 is connected to the CPU 1. Symbols R1, R2 and R3 designate resistors, and C1 and C2 designate capacitors.

The CPU 1 outputs a signal SOUT periodically to the transistor TR1 to drive the transistor TR1. The LED D1 driven by the transistor TR1 emits light. When plenty of a food stuff remains, light emitted from the LED D1 is interrupted by the food stuff and never reaches the phototransistor. In this state, the signal VOUT is not outputted from the phototransistor, and the transistor TR2 keeps its OFF state. Therefore, a high level ("H" level) signal is inputted to the inverting amplifier iC1. And, the input signal SIN keeps its low state ("L" level). As soon as the top of the food stuff is lowered below the level, i.e. in the deficiency level, at which the light emitter 5a and detector 5b of the deficiency sensor are positioned, the phototransistor detects the light emitted from the LED D1 and outputs the signal VOUT to make the transistor TR2 conductive. As soon as the transistor TR2 becomes conductive, the signal SIN to the CPU 1 is boosted to the H level. The CPU 1, which has received the signal SIN at the H level judges that a certain food item is in the state of deficiency. The signal SIN at the H level is a deficiency signal described below.

In the foregoing case of cooking tacos, a deficiency sensor 5A is a sensor which detects the state in which the residual amount of tortillas, used as the shells for the tacos and piled up on the shelves of the tortilla delivery mechanism (slave 4A), is few. A deficiency sensor 5B is a sensor for detecting the state in which the residual amount of the ground meat or beef stored in the hopper of the ground meat or beef delivery mechanism (slave 4B) is few. The light emitter and detector of the deficiency sensor 5B are installed on the hopper through optical windows formed on the side wall of the hopper. The light emitter and detector of the deficiency sensor 5B are positioned at a level higher than the bottom of the hopper for a predetermined distance. As for the sour cream delivery mechanism (slave 4C), the application of a deficiency sensor 5C may be facilitated by making the flexible tube of the sour cream delivery mechanism 4C of an optically transparent material.

Figure 2:
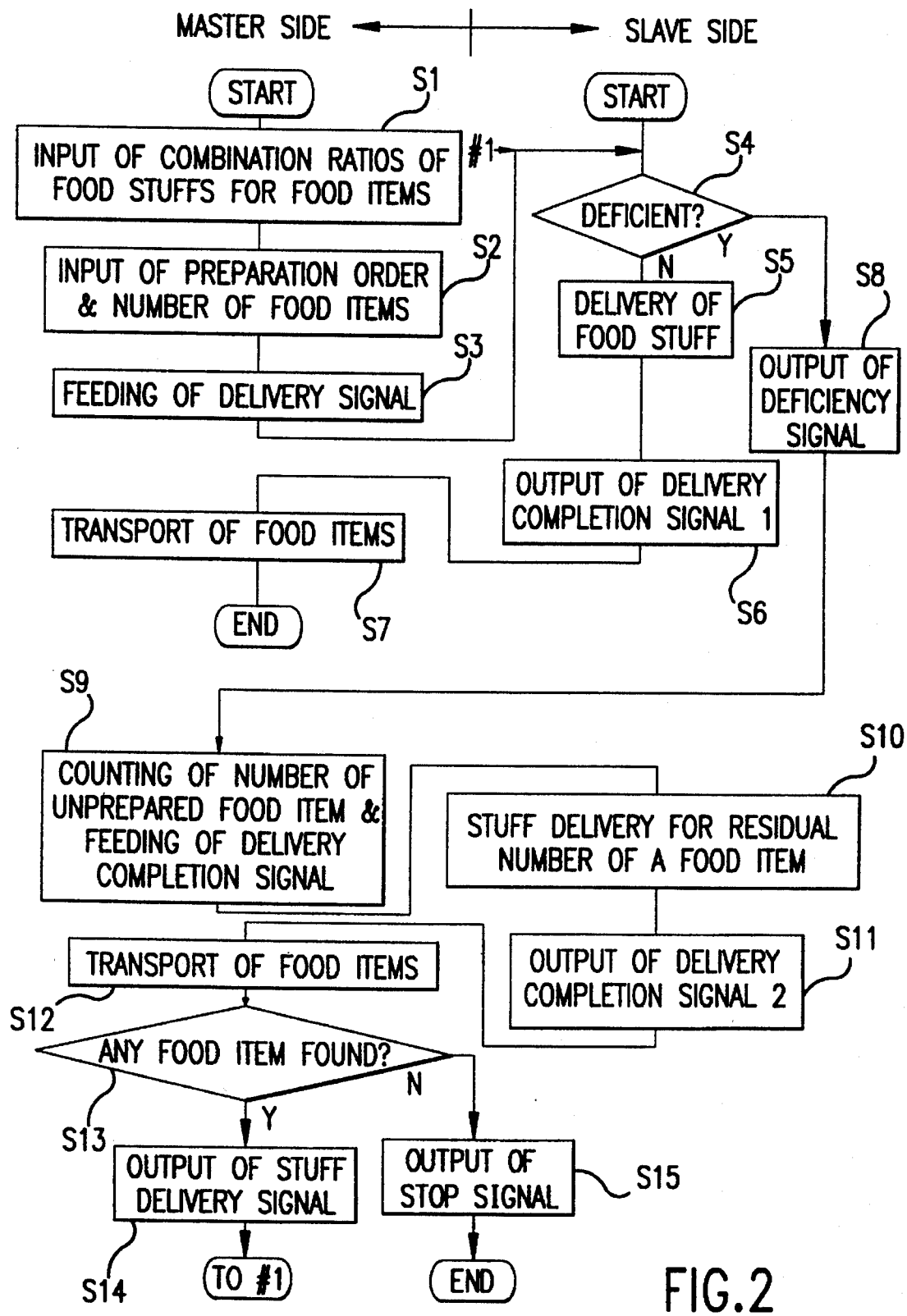
FIG. 2 is a flow chart for explaining the operation of the control apparatus of FIG. 1.

FIG. 2 is a flow chart for explaining the operation of the control apparatus of FIG. 1.

As soon as the control apparatus of FIG. 1 is ready to operate, combinations and combination ratios of food stuffs for the food items are inputted from the MMI 2 (Step 1) to the CPU 1. Then, preparation order and number of the food items are fed from the MMI 2 (Step 2) to the CPU 1. The CPU 1 outputs stuff delivery signals to the slaves 4A through 4D based on the input data (Step 3).

The slaves 4A through 4D judge, at first, whether the food stuffs are in the deficiency state or not when the food stuff delivery signals are fed from the CPU 1 (Step 4). When the pertinent food stuffs are not in the deficiency state, a first food stuff is delivered (Step 5). The slave that has completed the delivery of the food stuff sends a signal indicative of completion of food stuff delivery (delivery completion signal) to the CPU 1 (Step 6). And, the first food stuff is transported on the conveyor 8 to the next delivery position for receiving a second food stuff to be added to the first food stuff (Step 7).

When a food stuff is in its deficiency state, the pertinent slave sends a signal indicating the deficiency state of the food stuff (deficiency signal) to the CPU 1 (Step 8). The CPU 1 that has received the deficiency signal sends an instruction signal to the slaves 4A through 4D. The instruction signal commands the slaves 4A through 4D, based on the stuff number assigned to the food item in its deficiency state, to deliver the food stuffs corresponding to the number of the food items which are already on the conveyer 8 and have already received the other food stuff or food stuffs (Step 9).

The slaves 4A through 4D which have received the instruction signal deliver the respective food stuffs to the instructed number of the food items (Step 10). The slave that has completed the instructed food stuff delivery sends a delivery completion signal to the CPU 1 (Step 11). And, the food item or items which have received the food stuff supply is transported on the conveyor 8 (Step 12). The CPU 1 that has received the delivery completion signal looks up the menu to find whether any food item, that can be prepared without using the food stuff or food stuffs in their deficiency states, has been inputted (ordered) or not (Step 13). If any food item, that can be prepared without using the food stuff or the food stuffs in the deficiency state, is found, the CPU 1 sends stuff delivery signals to the slaves 4A through 4D based on the found food item (Step 14). If any food item, that can be prepared without using the food stuff or the food stuffs in the deficiency state, is not found, the CPU 1 sends a stop signal to the slaves 4A through 4D to stop stuff delivery from the slaves 4A through 4D (Step 15).

Figure 3A:
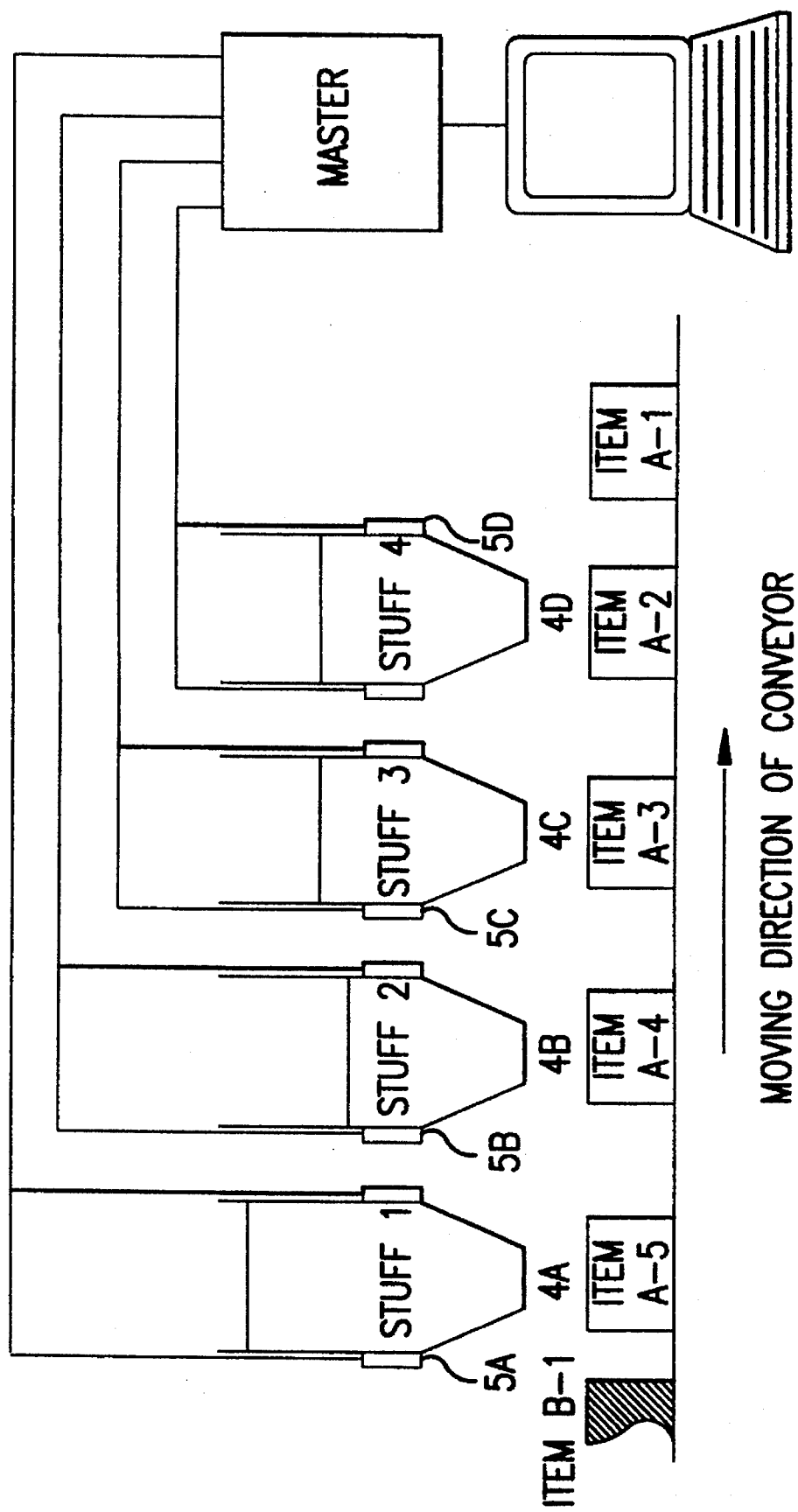
FIG. 3(A) is a schematic view for explaining the present invention in detail.
Figure 4:
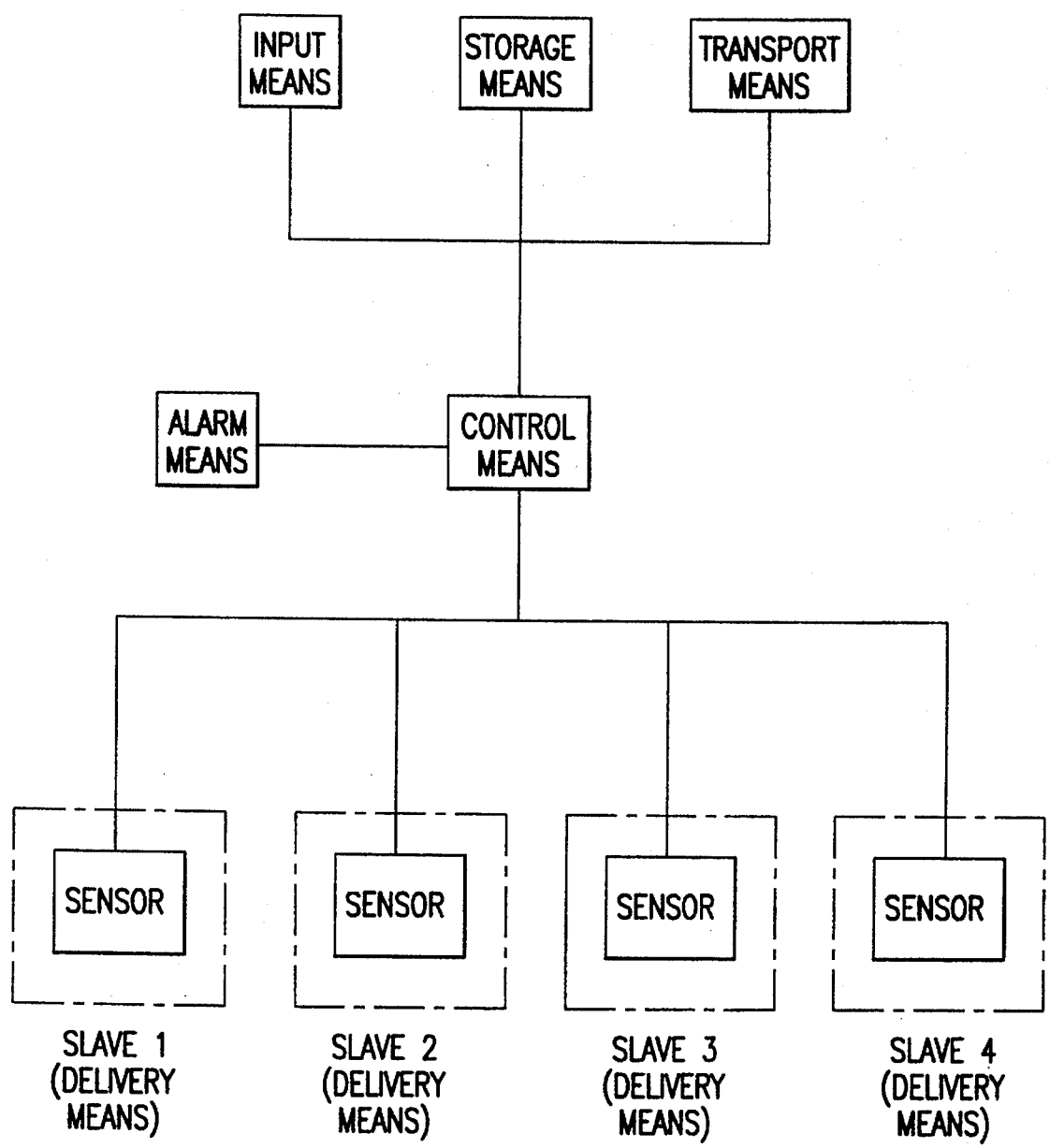
FIG. 4 is a diagram relating to the constituent elements of one aspect of the invention.

FIG. 3(A) is a schematic view for explaining the present invention more in detail. FIG. 3(B) is a screen image displaying the combination ratios of the food stuffs for the food items. FIG. 3(C) is a screen image displaying the preparation order (e.g. food item A at first, then food item B, then food item C . . . ) and number of food items to be prepared. And, FIG. 3(D) is a screen image displaying the food item in which the preparation is interrupted, and the number of the ordered but unprepared food item. For example, the food stuff No. 2 is in the deficiency state, while the food item B is during preparation, and five food item A's are left unprepared. In the following explanation, cooking data is inputted as shown in FIGS. 3(B) and 3(C).

If the food stuff No. 2 is brought to its deficiency state during preparation of the fourth food item A, the CPU 1 that has received a deficiency signal from the slave 4B judges that one of the food item A is remaining, since the fifth food item A has already received the food stuff 1 from the slave 4A. The CPU 1 sends an instruction signal for commanding the slave 4B to deliver the food stuff No. 2 to the fifth food item A. The CPU 1 also searches whether the order for any food item that can be prepared without using the food stuff No. 2 has been inputted from the MMI 2 or not.

If the order for the food item B that does not need the food stuff No. 2 has been inputted as shown in FIG. 3(B), the CPU 1 sends stuff delivery signals to the slaves 4A, 4C and 4D so as to prepare the food item B. The CPU 1 does not send any stuff delivery signal to the slave 4B that delivers the food stuff No. 2. And, the MMI 2 displays the stuff No. 2 in its deficiency state, the food item A in which the preparation has been interrupted, and the unprepared number of the interrupted food item A as shown in FIG. 3(D) so as to encourage supply of the food stuff No. 2 to the slave 4B.

Since the automatic cooking apparatus is keep cooking according to the present invention even when the residual amount of a food stuff is not enough, as far as a food item that can be prepared from other stuffs exists, the net operation efficiency of the automatic cooking apparatus is improved.

What is claimed is:

1. An automatic cooking apparatus for preparing various food items by combining plural kinds of food stuffs, comprising:

a plurality of delivery means, each delivery means storing one kind of food stuff and delivering the same;

transport means situated under the delivery means, said transport means transporting a food item during preparation to the delivery means;

input means for inputting data including a menu, combination ratios of the food stuffs for various food items and number of food item to be prepared;

storage means for storing the input data and electrically connected to the input means;

transmitting means electrically connected between the storage means and said plurality of delivery means for transmitting the input data to the delivery means;

sensors situated in the respective delivery means and electrically connected to the input means, each sensor detecting deficiency of the food stuff stored in each delivery means;

alarm means electrically connected to the input means for alarming the deficiency of the food stuff; and control means connected to the delivery means, the transport means, the input means, the storage means and the transmitting means for controlling the same.

2. An automatic cooking apparatus of claim 1, wherein each sensor has an operation such that if the sensor detects the deficiency of the food stuff, the sensor sends a deficiency signal to the control means.

3. An automatic cooking apparatus of claim 2, wherein the control means has an operation such that when the control means receives the deficiency signal of the food stuff from one of the sensors, the control means judges whether any food item that can be prepared from remaining food stuffs has been ordered or not; if the control means has found that a food item that can be prepared from the remaining food stuffs has been ordered, the control means controls the delivery means to continue preparing the food item that can be prepared; and if the control means has found that any food item that can be prepared from the remaining food stuffs has not been ordered, the control means controls the alarm means to alarm the deficiency of the food stuff.

4. An automatic cooking apparatus of claim 1, wherein each of the sensors comprises a light emitter and a light detector facing with each other across the delivery means.

5. An automatic cooking apparatus of claim 4, wherein the light emitter comprises a light emitting diode.

6. An automatic cooking apparatus of claim 4, wherein the light detector comprises one of a phototransistor and a photodiode.

* * * * *

UNITED STATES PATENT AND TRADEMARK OFFICE
CERTIFICATE OF CORRECTION

PATENT NO. : 5,619,906
DATED : April 15, 1997
INVENTOR(S) : Takashi Ishida

It is certified that error appears in the above-indentified patent and that said Letters Patent is hereby corrected as shown below:

In column 1, line 62, change "facing with each other" to --facing each other--;

In column 5, line 2, change "A" to --A's--;

line 3, change "food stuff 1" to --food stuff No. 1--;

line 19, change "is keep cooking" to --keeps cooking--; and

In column 6, line 32, change "facing with each other" to --facing each other--.

Signed and Sealed this

Sixteenth Day of September, 1997

Attest:

BRUCE LEHMAN

*Attesting Officer*   Commissioner of Patents and Trademarks